Figure 1:
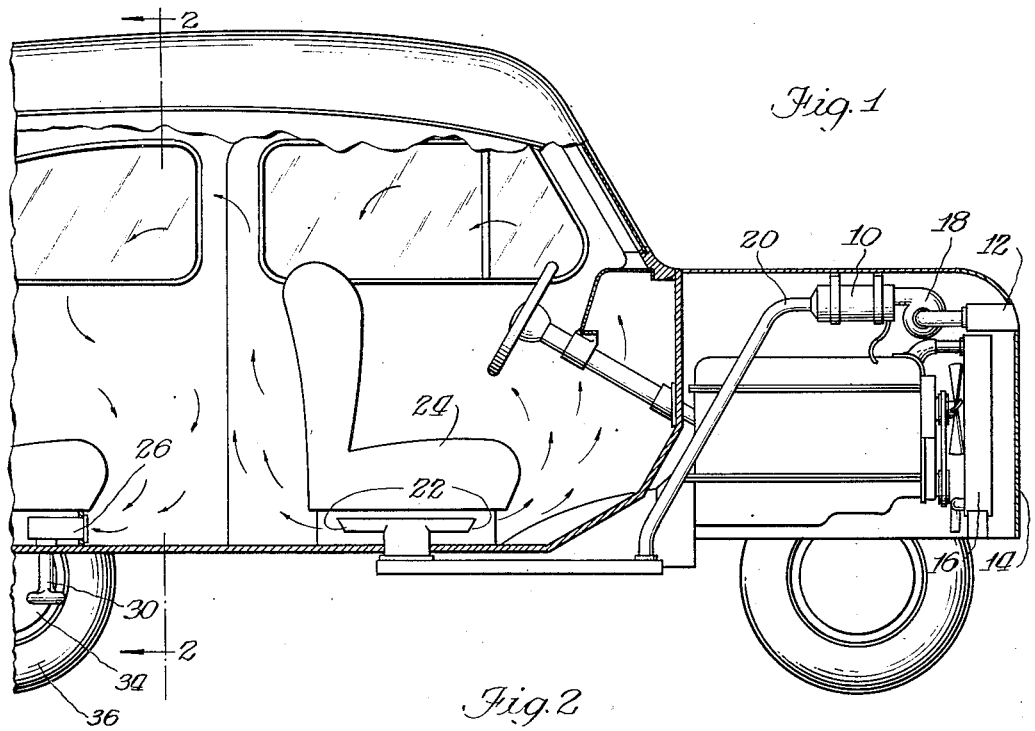

Dec. 12, 1950

L. A. RODERT 2,533,509

HEATING AND VENTILATING SYSTEM

Filed April 10, 1946

Inventor:
Lewis A. Rodert
By: Williams, Bradbury & Hinkle
Attorneys

Patented Dec. 12, 1950

2,533,509

UNITED STATES PATENT OFFICE 2,533,509

HEATING AND VENTILATING SYSTEM

Lewis A. Rodert, Indianapolis, Ind., assignor to Stewart-Warner Corporation, Chicago, Ill., a corporation of Virginia Application April 10, 1946, Serial No. 661,087

3 Claims. (Cl. 98—2)

The present invention relates to the art of heating and ventilation and more particularly to a heating and ventilating system adapted for use in automotive vehicles, such as passenger automobiles, for instance.

One of the objects of the present invention is to provide adequate heating and ventilation of an automobile by means of hot air without requiring excessive power for operation of blowers for moving the air stream.

Another object of the present invention is to provide an improved heating and ventilating system for an automobile which uses all fresh air from the outside rather than recirculated air, therefore greatly reducing the possibility of window and windshield fogging in addition to the advantages more usually associated with an adequate ventilating system, and which further accomplishes this with a minimum power consumption for the operation of blowers.

Yet another object of the present invention is to accomplish the above in a simple manner and at low cost.

Other objects and advantages will become apparent from a preferred embodiment of my invention which is illustrated in the accompanying drawings.

Figure 2:
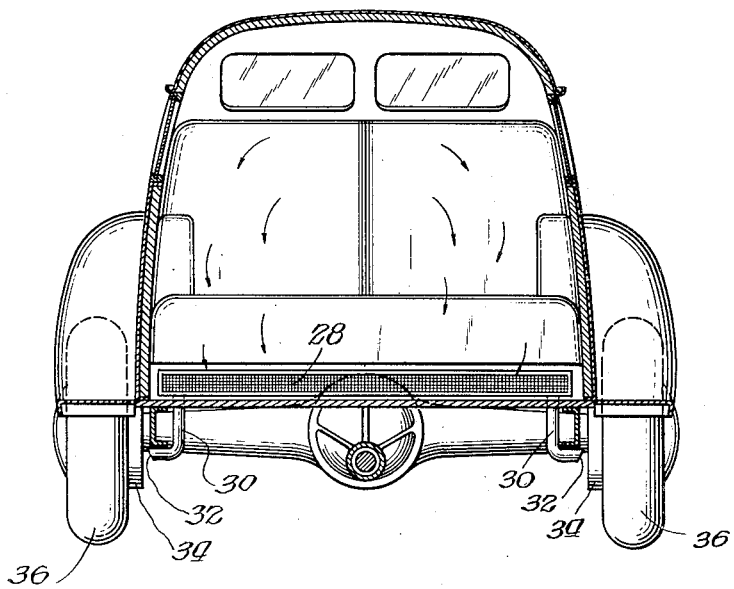

In the drawings:

Fig. 1 may be considered as a side view of a portion of an automobile having a heating system according to the present invention, portions of the figure being shown in section and other portions being broken away so as better to illustrate the invention; and Fig. 2 is a transverse sectional view through the automobile of Fig. 1 taken along the line 2—2 and looking rearwardly as indicated by the arrows.

In order to provide adequate ventilation for an automobile, particularly in severe weather, it is advisable not to recirculate the air within the vehicle, since the heating of recirculated air soon results in the humidity rising to an unsatisfactory level with the result that the windows and windshield are likely to become obscured by fog. By heating fresh air from the outside and using it once only, without recirculation, it is possible to keep the humidity within the interior sufficiently low so as to prevent fogging in most instances. Also, since an automobile must be able to confine several passengers in comparatively small space, a frequent change of air within the vehicle is advisable.

The system for introducing hot air into the vehicle comprises a hot air heater 10, which may be of the type described and illustrated in the copending application of George W. Allen and Vernon N. Tramontini, filed June 14, 1946, for heater, and which has been assigned Serial No. 676,766. Such a heater burns gasoline as fuel and heats ventilating air taken in through the open end of a duct 12 located behind the radiator grill, preferably in a position ahead of the radiator 16. Air is passed backwardly through the duct 12 into the inlet opening of an electrically driven blower 18 from which it is forced into the heater 10. Within the heater the temperature of the air is raised, the hot air then passing into a hot air duct 20 shown as leading to outlet openings 22 located beneath the front seat 24 of the automobile. Other outlet openings about the vehicle and a more extensive duct system may be used, if desired, but the simple arrangement illustrated is adequate for explaining the principle of the present invention.

Such a system, when operated alone, takes air in at the opening 12, places the air under pressure at the blower 18, heats it in the heater 10, and forces it into the automobile body through the openings 22. If the automobile windows are closed, the air forced in through the openings 22 must find its way out through leaks around doors and windows and perhaps through the floor. Even though the automobile body is quite leaky, it is apparent that the blower 18 must raise the pressure within the automobile body sufficiently to force the air outwardly through whatever leaks exist. If the body is comparatively free from leaks, the pressure rise may have to be considerable, thereby placing a heavy load upon the blower 18 and its driving motor. Also, even though it is assumed that leaks are present in considerable quantity, there is no assurance that such leaks will be located at low pressure regions. For instance, leaks around the leading edges of the doors may actually produce a pressure within the automobile body above atmospheric, thereby necessitating the blower to force air outwardly against this pressure.

In order to obviate this difficulty I have provided a special scavenging system or outlet duct for discharging air from the vehicle, a portion of this duct being indicated by the numeral 26. The duct is formed as a long shallow box and extends transversely beneath the rear seat of the automobile. It has a longitudinally extending slot in its front face preferably covered by a grill 28. The duct 26 may be formed entirely as a separate element from the automobile structure in the manner shown in Fig. 1 or, if preferred, it may be formed simply as a three-sided box secured to the floor of the vehicle, so that the remaining side is formed by the vehicle floor.

At each end, the duct or box 26 is connected to downwardly extending tubes 30 which are arranged to have their outlet openings 32 as close as possible to the brake drums 34 of the adjacent rear wheel 36. Thus, each of the rotating rear wheels acts much in the manner of a centrifugal impeller to produce a pressure considerably below atmospheric adjacent the center of rotation or, in other words, adjacent the outlet opening 32. Inasmuch as this region is considerably below atmospheric pressure, particularly at high speeds, when leaks around the leading edges of the doors might give troublesome positive pressures within the vehicle, it will be seen that the cross duct 26 and downwardly extending tubes 30 together with the wheels 36 act together as a scavenging system tending to create a subatmospheric pressure within the vehicle. That is, the pressure would be subatmospheric were it not for the inlet duct 20.

Whether or not the pressure actually is subatmospheric in any particular instance will depend upon several variables including the pressure producing effect of the ramming opening 12, the blower 18, and the ramming effect at the leading edges of the doors or at other leaks located in high pressure regions, all of which tend to produce a superatmospheric pressure and therefore tend to offset the subatmospheric pressure producing effect of the scavenging system. In general, the interior pressure can be adjusted to produce any effect desired. Probably the preferable, although not the lowest cost, arrangement is to balance the system in such manner that the blower 18 keeps the pressure within the automobile body at approximately atmospheric pressure because operation of the heating system with too great a subatmospheric interior pressure may cause sufficient cold air to leak in around the doors to be objectionable. This, however, is not true if the body is relatively free from leaks. Under some conditions, it is possible to operate the heating system without running the blower 18 as sufficient flow through the system can be produced by the suction effect of the scavenging system alone.

The important feature of the invention is that the system can be adjusted to produce adequate flow of air through the heater and vehicle body without depending upon the blower 18 to force all of the ventilating air out through leaks in the automobile body, and that if desired, the interior pressure can be subatmospheric. To depend upon the blower to force ventilating air out through leaks is objectionable, since the amount of leakage in automobile bodies varies widely depending upon the make and style of body and upon the age of the vehicle. To overcome the exit pressure drop through leaks in relatively tight automobile bodies would require a blower of considerable capacity which in turn would require a more expensive blower and motor, thereby increasing the cost of the heating equipment. All this is obviated by the use of the cross duct 26 and the scavenging arrangement described, since with the use of such a system the blower 18 can be designed with the assurance that it will not have to overcome any pressure drop excepting that of the ductwork connected directly to the heater.

Having thus described by invention, what I claim as new and useful and desire to secure by Letters Patent of the United States is:

1. A heating and ventilating system for a vehicle having rotatable wheels for supporting the vehicle upon the ground, said wheels having tires thereon comprising a hot air heater having inlet and outlet openings, duct means for conveying air to be heated from outside the vehicle to said inlet opening, duct means for conveying hot air from said outlet opening to the space within the vehicle, means forming a used air outlet opening, and duct means extending from the last said opening to the region adjacent one of the wheel axles and the last said duct means having an exhaust opening at substantially right angles to the last said wheel and said exhaust opening being located close to said wheel and between the wheel axle and the tire on said wheel.

2. In a ventilating system for an automobile body the combination comprising means forming an outlet opening through the wall of said body, and duct means leading from said opening to the region alongside of one of the wheel axles of said automobile said duct having an exhaust opening adjacent to the axle and close to the wheel thereon so as to be within the low pressure area established near the center of the wheel when the wheel is rotating.

3. A heating and ventilating system for a vehicle having rotatable wheels comprising means for heating air taken from outside said vehicle and for forcing said air into the interior of said vehicle, and duct means leading from the space within said vehicle, said duct means having an exhaust opening positioned adjacent one of said wheels and close to the axle of said wheel.

LEWIS A. RODERT.

REFERENCES CITED

The following references are of record in the file of this patent:

UNITED STATES PATENTS

| Number | Name | Date |
| --- | --- | --- |
| 1,594,894 | Masury | Aug. 3, 1926 |
| 2,039,403 | Gillette | May 5, 1936 |
| 2,104,246 | Schwartz | Jan. 4, 1938 |
| 2,160,318 | Stone | May 30, 1939 |
| 2,203,477 | Wahlberg | June 4, 1940 |
| 2,230,809 | Litern et al. | Feb. 4, 1941 |
| 2,372,377 | Hans | Mar. 27, 1945 |
| 2,420,269 | Stone | May 6, 1947 |